UNITED STATES PATENT OFFICE.

HAROLD EDWIN CLEAVES AND FREDERICK W. HORTON, OF WASHINGTON, DISTRICT OF COLUMBIA.

PROCESS OF TREATING ORES.

1,268,323.

Specification of Letters Patent.

Patented June 4, 1918.

No Drawing.   Application filed March 14, 1917.   Serial No. 154,759.

*To all whom it may concern:*

Be it known that we, HAROLD EDWIN CLEAVES and FREDERICK W. HORTON, citizens of the United States, and residents of Washington, in the District of Columbia, have invented certain new and useful Improvements in Processes of Treating Ores, of which the following is a specification.

This invention relates to a process of treating ores and compounds containing one or more of the metals copper, lead and zinc; and comprises subjecting such ores and compounds, while maintained at a high temperature under non-oxidizing conditions, to the action of a gaseous reagent such as hydrogen chlorid.

One object of the present invention is the rapid and efficient treatment of ores and compounds of the above mentioned metals to produce chlorids of said metals, for the purpose of facilitating their separation from each other and from other undesirable metals and metalloids. The process is especially valuable for the reason that it is applicable to low grade ores and low grade concentration products as well as to the higher grade material.

The frequent occurrence of ores containing large proportions of lead and zinc minerals so intimately mixed as to render their separation by mechanical methods exceedingly difficult, has raised a problem of great importance. As is well known, the extensive deposits of such ores at Broken Hill (N. S. W.), containing intimate mixtures of galena and zinc blende, have heretofore been worked with any degree of success only by supplementing the ordinary methods of dressing by flotation processes. A similar condition exists in the Leadville district (Colorado) where special methods of treatment are necessary to free the lead ores from objectionable proportions of zinc, and the zinc ores from objectionable proportions of lead.

The presence of substantial proportions of zinc in a lead ore is the cause of serious difficulties in the lead blast furnace. If zinc is present as the oxid, it enters the slag; if it is to be properly carried off the slag must be very fusible, and the furnace must be run at a low temperature so as not to reduce the oxid to metal. When the zinc is in the form of sulfid, as is often the case, the blende enters both slag and matte, rendering them less fusible and obstructing their separation, as well as carrying other metal sulfids into the slag. When zinc oxid is reduced to metal in the lower part of the furnace, it becomes volatilized, and the ascending vapor carries with it lead and silver, which cannot be conveniently recovered; higher up the metal becomes oxidized and forms objectionable accretions on the sides of the furnace.

Lead, especially as the sulfid, is considered objectionable in zinc ores because in the roasting there is either a difficultly decomposible lead sulfate formed, or, with sufficient silica, a lead silicate which is very fusible and tends to envelop particles of blende and to prevent their desulfurization. There is also a large loss of lead due to volatilization. Lead present during the zinc reduction and distillation, forms lead silicate which acts corrosively on the retorts and tends to hinder the reduction by enveloping particles of zinc oxid. Part of the lead is also reduced and volatilized with the zinc, the latter being thereby contaminated.

The new process consists essentially in passing a current of hydrogen chlorid in contact with an ore or compound containing one or more of the metals, copper, lead, and zinc, associated with other metals or metalloids while maintaining the material at a temperature (*e. g.* 800–1100° C.) at which a chlorid or chlorids of one or more of the metals is formed and volatilized and removed by the current of gas. The volatilized chlorids may be separated from the hydrogen chlorid by passing the gas through a condenser or into water. When a mixture of metal chlorid is thus obtained they may be readily separated by fractional distillation or by precipitation methods.

The following examples illustrate the process in greater detail:

Example I: An ore containing an intimate mixture of lead and zinc sulfid such as is common in the Leadville district (Col.) is finely ground and placed in a thin layer in a furnace; dry hydrogen chlorid is passed over the material, heated to 900°–1000° C., and the resulting gas mixture is led through a condenser or led into water or into a hydrochloric acid solution to separate out the volatilized chlorids. After a short time the lead and zinc sulfids are completely decomposed and volatilized, the products of the reaction being lead chlorid, zinc chlorid and hydrogen sulfid.

Example II: Willemite ($Zn_2SiO_4$) is finely ground and subjected at a high temperature to the action of hydrogen chlorid, as in Example I. The mineral is readily decomposed, the zinc chlorid formed being volatilized and recovered by passing the gas into water. The residue remaining in the furnace consists essentially of silica.

Many other ores and minerals containing lead and zinc are quickly decomposed when treated at high temperatures with hydrogen chlorid. Thus franklinite, $(Fe,Zn,Mn)O(Fe,Mn)_2O_3$, is almost completely decomposed and volatilized. Cerrussite, $PbCO_3$, is readily acted on, lead chlorid being volatilized. As other instances of minerals which may be successfully treated there may be mentioned zincite, $(Zn,Mn)O$, smithsonite, $ZnCO_3$, and calamine, $Zn(OH)_2SiO_3$.

The process as applied to ores and minerals containing copper may be illustrated as follows:

Example III: Chrysocolla, $CuSiO_3.2H_2O$, is finely ground and, while heated to about 1000° C., is treated with hydrogen chlorid. In a short time the mineral is decomposed, the copper chlorid which is formed being volatilized, leaving practically pure silica in the furnace.

Example IV: Chalcopyrite, $CuFeS_2$, is heated to 1000–1100° C. and a stream of dry hydrogen chlorid is passed over the heated material. The chlorids of iron and copper are quickly formed and volatilized along with hydrogen sulfid. A small amount of silica, which was present in the mineral, remains in the furnace.

Ores containing such minerals as chalcocite ($Cu_2S$), cuprite ($Cu_2O$), malachite ($CuCO_3.Cu(OH)_2$), azurite ($2CuCO_3.Cu(OH)_2$), bornite ($Cu_3FeS_3$), tenorite ($CuO$), tetrahedrite ($4Cu_2S.Sb_2S_3$), etc., are readily acted on, the chlorids of the metals being formed and volatilized with great celerity, leaving a residue of silica which in many cases seems to be practically pure $SiO_2$.

In order to prevent unnecessary loss of hydrogen chlorid, and reoxidation of the metals in the material treated, it is desirable to carry out the process with the exclusion of air. The hydrogen chlorid should be dry for the same reason.

Hydrogen halids other than hydrogen chlorid may be used to form metal halids, but they are as a rule more expensive than hydrogen chlorid and offer no special advantages.

We claim:

1. The process of treating ores or compounds which contain one or more of the metals copper, lead, and zinc, associated with undesirable substances, which comprises treating such ores or compounds with a gaseous reagent capable of reacting with said metals under non-oxidizing conditions to form volatile metal compounds, while maintaining such ores or compounds at a temperature at which one or more of the metal compounds thus formed will be volatilized.

2. The process of treating ores or compounds which contain one or more of the metals lead and zinc, which comprises treating such ores or compounds with a gas containing hydrogen chlorid, while maintaining the ores or compounds at a temperature at which one or more metal chlorids will be formed and volatilized.

3. The process of treating ores or compounds which contain one or more of the metals lead and zinc, which comprises treating such ores or compounds with a gas containing hydrogen chlorid, while maintaining the ores or compounds at a temperature of from 800 to 1100° C.

4. The process of treating ores containing lead and zinc sulfids which comprises passing hydrogen chlorid in contact with the ore, while maintaining the latter at a temperature at which lead and zinc chlorids and hydrogen sulfid will be formed and at least one of said substances volatilized.

5. The process of treating material containing lead and zinc sulfids which comprises passing a stream of hydrogen chlorid over said material while maintaining the latter at a temperature of about 1000° C., leading off the resulting gas containing lead and zinc chlorids and separating said chlorids from the gas.

In testimony whereof we affix our signatures.

HAROLD EDWIN CLEAVES.
FREDERICK W. HORTON.